M. A. MILLS.
SHAFT MOUNTING FOR ROTARY PUMPS.
APPLICATION FILED JULY 26, 1905.

934,084.

Patented Sept. 14, 1909.
2 SHEETS—SHEET 1.

Inventor
Melvin A. Mills

M. A. MILLS.
SHAFT MOUNTING FOR ROTARY PUMPS.
APPLICATION FILED JULY 26, 1905.

934,084.

Patented Sept. 14, 1909.
2 SHEETS—SHEET 2.

Witnesses

Inventor
Melvin A. Mills
By
Attorney

UNITED STATES PATENT OFFICE.

MELVIN A. MILLS, OF LAWRENCE, MASSACHUSETTS.

SHAFT-MOUNTING FOR ROTARY PUMPS.

934,084. Specification of Letters Patent. Patented Sept. 14, 1909.

Application filed July 26, 1905. Serial No. 271,350.

*To all whom it may concern:*

Be it known that I, MELVIN A. MILLS, citizen of the United States, residing at Lawrence, in the county of Essex and State of Massachusetts, have invented certain new and useful Improvements in Shaft-Mountings for Rotary Pumps, of which the following is a specification.

This invention relates to rotary or centrifugal pumps of the type commonly termed fan pumps, and has in view the provision of certain novel and practical improvements in this class of pumps, which will increase the utility and efficiency thereof.

To this end the invention contemplates a rotary pump having the various elements thereof so constructed and arranged as to secure a strong and perfect bearing support for the pumping shaft and also for the pumping devices. In this connection, the invention has specially in view a simple and practical type of outer bearing for the pumping shaft, said outer bearing being associated with a shiftable belt-accommodating bearing support which can be shifted or adjusted to variable positions, while at the same time rigidly supporting the bearing for the outer extremity of the pumping or piston shaft, and accommodating the driving belt in such a way that the latter can be run either up through the floor, down from the ceiling, or in fact in any direction. This provides a very practical improvement inasmuch as the pump can be adapted to any position of power shafting from which the same is driven.

With these and other objects in view which will more readily appear as the nature of the invention is better understood, the same consists in the novel construction, combination, and arrangement of parts which will be hereinafter more fully described, illustrated and claimed.

The essential features of the invention, involved in carrying out the objects above indicated, are necessarily susceptible to structural change without departing from the scope of the invention, but a preferred embodiment thereof is shown in the accompanying drawings, in which—

Figure 1:
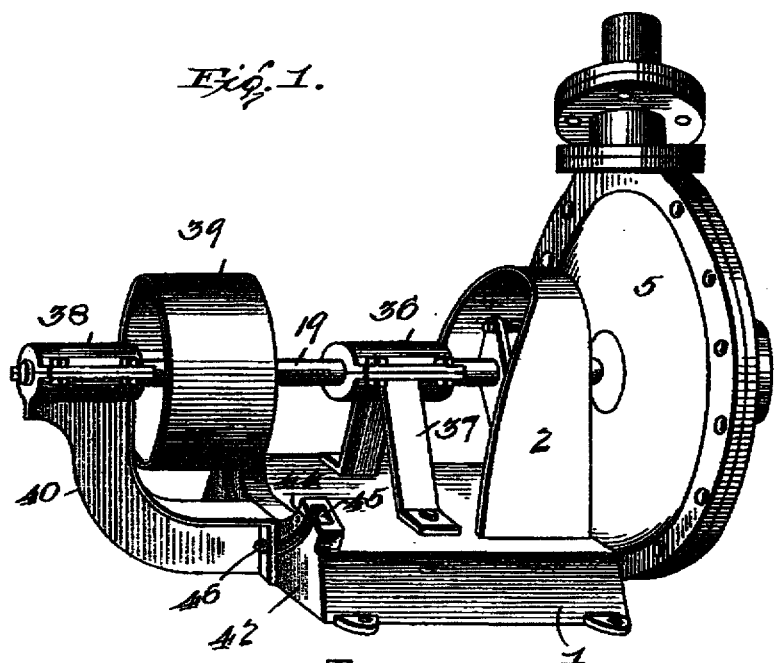
Figure 2:
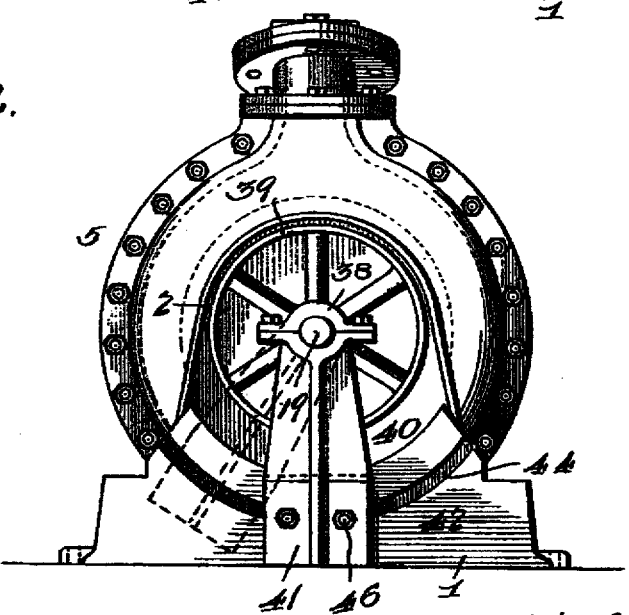
Figure 3:
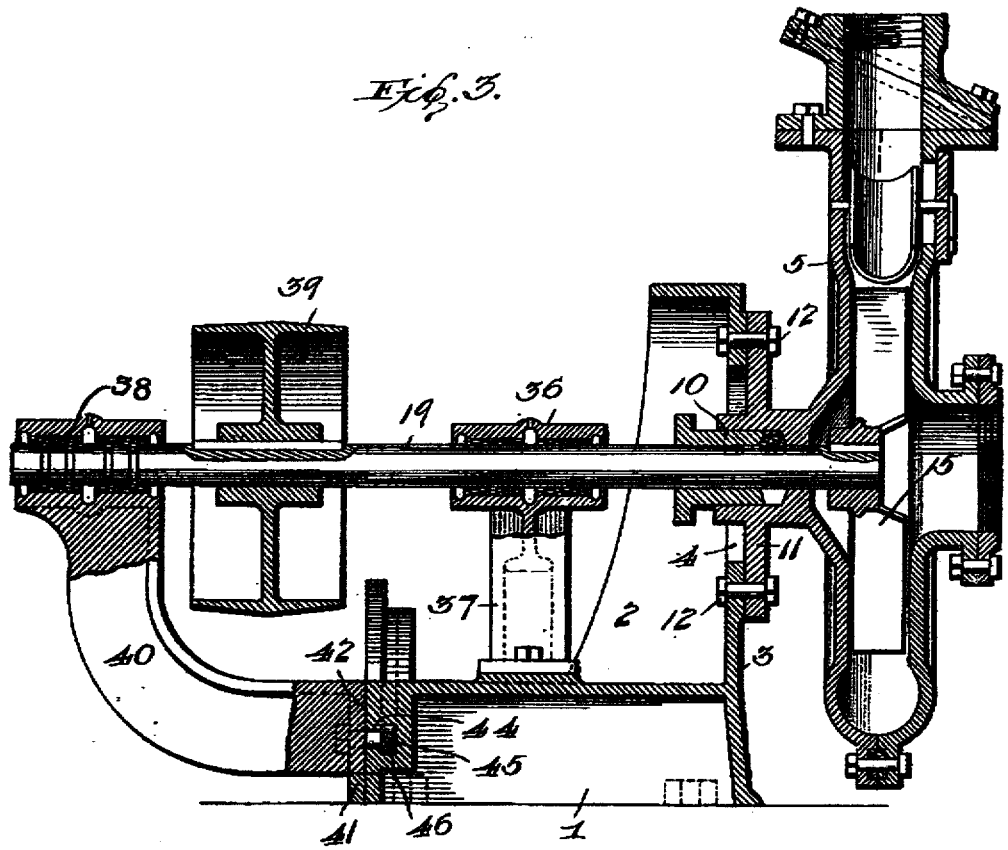

Figure 1 is a perspective view of a rotary or fan pump embodying the improvements of the present invention; Fig. 2 is an end view thereof showing in dotted lines a shifted position of the belt accommodating bearing support or bracket; Fig. 3 is an enlarged vertical longitudinal sectional view of the pump.

Like reference numerals designate corresponding parts in the several figures of the drawings.

While the present invention has special reference to the bearing support or mounting for the pump shaft and the parts associated therewith, the invention possesses special utility in its application to a pump of the specific construction shown in the drawings, and hence, for illustrative purposes, a general description of this pump is given herein.

The working parts of the pump are supported upon a bed piece 1 of suitable strength and dimensions according to the size of the pump. The bed piece has preferably cast integrally therewith at or contiguous to one side thereof an upstanding hanger standard 2 usually of a flanged formation and presenting a flat side web 3 having an enlarged central opening 4 therein and adapted to have rigidly supported thereon from the supporting flange 11 the vertically arranged pump case 5.

The rotary piston or pumping shaft 19 turns in a center bearing 36 carried upon the upper end of a central bearing bracket 37 mounted on top of the bed piece 1, and the outer extremity of the said shaft 19 also turns in an outer bearing box 38. Between the outer and central bearings 38 and 36, the piston shaft 19 has mounted thereon the driving pulley 39, and the outer bearing box 38 is carried upon the outer extremity of an arched bearing support or bracket 40. This bearing support or bracket 40 is arched around the belt pulley 39 and may be termed a shiftable belt accommodating bearing support inasmuch as the same has a laterally shiftable connection with the bed which permits the said support or bracket 40 to be moved to a position to accommodate the driving belt according to the direction in which it is led to the belt pulley. To provide for the connection referred to the bracket 40 is provided at its inner end with the supporting foot 41 shiftable upon the face of a base 42 formed at one side or end of the bed piece 1. The base 42 is constructed with a segmental guide 44 in which is formed a dove-tailed T-shaped or equivalent guide and lock groove 45 designed to receive the heads of slidable fastening bolts 46 engaging the supporting foot 41 of the bearing support or bracket 40. By loosening the bolts 46 the said supporting bracket may be shifted in a circular plane, and by tightening the said bolts the support or bracket is held perfectly fast in its adjusted position.

One end portion of the shaft 19 extends through, and has a bearing in, a combined stuffing box and bearing 10 carried with the flange 11, which latter is held in place by being bolted, by the bolts 12, to the web 3 of the standard 2. The inner extremity of said shaft 19 has suitably mounted thereon the bladed rotary piston 15 operating within the pump case 5.

From the foregoing, it is thought that the construction, operation, and many advantages of the herein described pump shaft mounting will be readily apparent without further description, and it will be understood that various changes in the form, proportion, and minor details of construction may be resorted to without departing from the scope of the invention or sacrificing any of the advantages thereof.

Having thus described the invention, what is claimed and desired to be secured by Letters Patent, is—

1. In a shaft mounting for pumps, the combination with the bed, a non-shiftable shaft and a pulley carried by said shaft, of a belt-accommodating support carrying at one end a bearing receiving and pivoting on the outer end of the shaft, and at its other end having a shiftable connection with the bed.

2. In a shaft mounting for pumps, the combination with a rotary shaft and a belt-pulley carried by said shaft, of a bed provided with a curved segmental guide, an offstanding belt-accommodating bracket carrying a bearing receiving and pivoting on the outer end of the shaft and arranged at the outer side of the pulley, said bracket having a foot engaging said segmental guide, and adjustable shiftable fastenings connecting said foot with said guide.

In testimony whereof I affix my signature in presence of witnesses.

MELVIN A. MILLS.

Witnesses:
WALTER COULSON,
JESSIE E. WELCH,
HELEN A. SMITH.